United States Patent [19]
Santi

[11] Patent Number: 5,655,433
[45] Date of Patent: Aug. 12, 1997

[54] PISTON-PISTON RING ASSEMBLY AND METHOD FOR REDUCING ENGINE EXHAUST EMISSIONS

[75] Inventor: John D. Santi, West Allis, Wis.

[73] Assignee: Briggs & Stratton Corporation, Wauwatosa, Wis.

[21] Appl. No.: 541,708

[22] Filed: Oct. 10, 1995

[51] Int. Cl.⁶ ........................................ F16J 1/04
[52] U.S. Cl. .................. 92/208; 92/82; 29/888.049; 123/193.6; 123/568; 277/171; 277/173
[58] Field of Search ................. 92/193, 195, 196, 92/200, 82, 208; 123/193.6, 568; 277/171, 173; 29/888.049

[56] References Cited

U.S. PATENT DOCUMENTS

| | | |
|---|---|---|
| 1,584,470 | 5/1926 | Quintenz . |
| 1,862,983 | 6/1932 | Roberts . |
| 1,984,409 | 12/1934 | Godron .................................. 277/173 |
| 2,160,379 | 5/1939 | Carroll . |
| 3,400,941 | 9/1968 | Hutto . |
| 3,542,376 | 11/1970 | Dykehouse . |
| 3,645,174 | 2/1972 | Prasse ....................................... 92/193 |
| 3,667,443 | 6/1972 | Currie et al. ......................... 123/193.6 |
| 3,831,952 | 8/1974 | Geffroy ................................... 277/171 |
| 3,901,131 | 8/1975 | Prasse ....................................... 92/200 |
| 4,362,136 | 12/1982 | Lipp ........................................ 277/173 |
| 4,475,739 | 10/1984 | Nakajima et al. . |
| 4,973,066 | 11/1990 | Duck et al. . |
| 5,147,094 | 9/1992 | Rehfeld . |
| 5,197,746 | 3/1993 | Rehfeld . |
| 5,392,692 | 2/1995 | Rao et al. . |

FOREIGN PATENT DOCUMENTS

| | | |
|---|---|---|
| 881483 | 4/1943 | France . |
| 55-69741 | 5/1980 | Japan . |
| 2-229964 | 9/1990 | Japan ..................................... 277/173 |

*Primary Examiner*—Thomas E. Denion
*Attorney, Agent, or Firm*—Michael, Best & Friedrich

[57] ABSTRACT

A piston—piston ring assembly for an internal combustion engine reduces hydrocarbon emissions without significantly increasing the cost of the engine. The assembly includes an upper piston ring groove and a piston ring which acts as check valve to prevent combustion gases trapped below the upper piston ring from re-entering the combustion chamber when the exhaust valve is opened. The invention also includes a venting means for providing fluid flow communication between the crankcase side of the upper piston ring and the crankcase, around one or more lower piston rings, so that any trapped combustion gases are vented only in the downward direction toward the crankcase. The venting means includes a vent passageway slot in the lower piston groove, as well as an aperture adjacent to the lower piston ring groove.

29 Claims, 3 Drawing Sheets

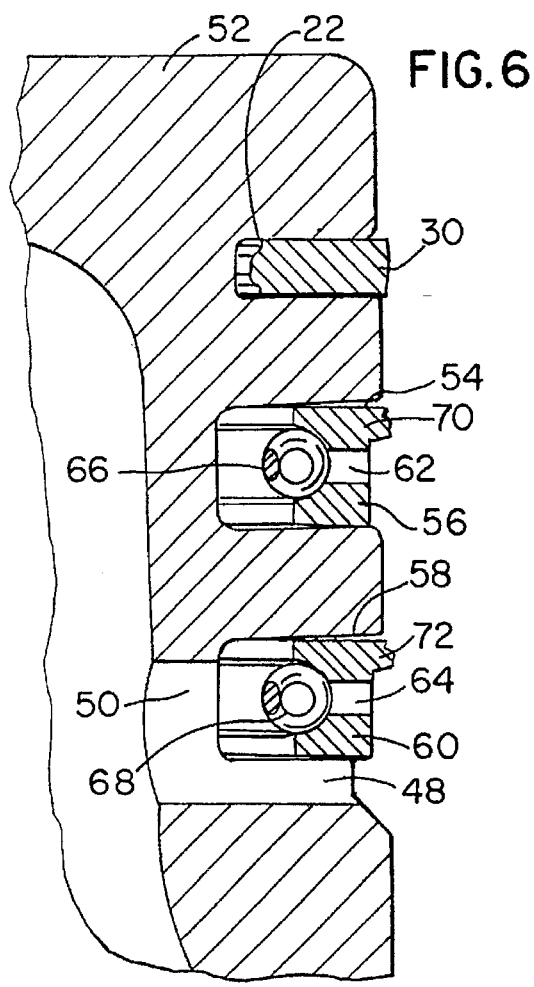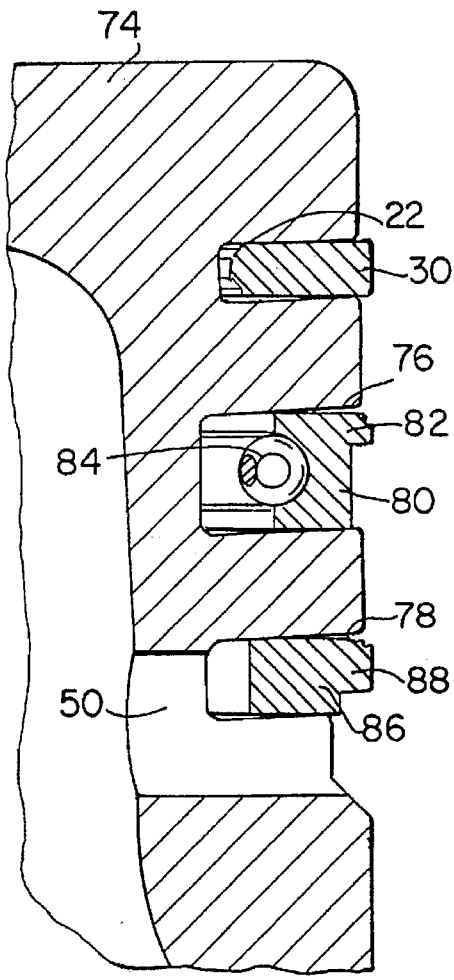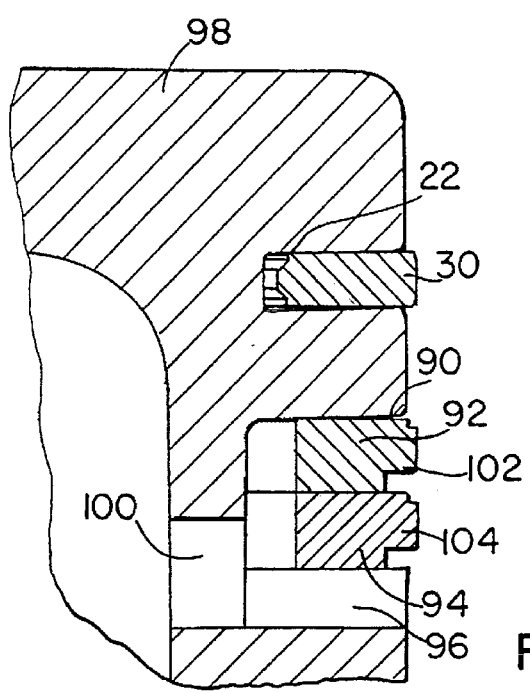

PISTON-PISTON RING ASSEMBLY AND METHOD FOR REDUCING ENGINE EXHAUST EMISSIONS

BACKGROUND OF THE INVENTION

This invention relates to piston and piston ring assemblies for internal combustion engines. More particularly, this invention relates to piston—piston ring assemblies that reduce engine exhaust emissions.

A typical prior art internal combustion engine has a crankcase for containing oil, at least one combustion chamber, and at least one piston that is generally disposed between the crankcase and the combustion chamber, and is reciprocable in a cylinder. The outer surface of the piston typically has three piston ring grooves formed in it, with a piston ring disposed in each of the grooves.

In a typical piston—piston ring assembly, the piston rings have several purposes. The piston ring closest to the combustion chamber, generally called the upper piston ring, has a primary purpose of sealing the combustion chamber against leakage of gases to maintain compression within the combustion chamber. However, the middle piston ring also provides some compression sealing.

The primary purpose of the lowest or third piston ring—the ring closest to the crankcase—is to control the amount of oil that enters and remains in the cylinder; the lowest piston ring has an oil wiper surface that wipes excess oil from the cylinder wall.

However, the upper and middle piston rings do not prevent all combustion gases, created during the combustion process, from passing into the space between the piston and the cylinder wall and into the space between the piston rings. Some combustion gases are trapped in the space between the outer surface of the piston and around the piston rings. When the exhaust valve is opened, these combustion gases pass back into the combustion chamber, past the opened exhaust valve, into the exhaust manifold, and out to the atmosphere because the pressure on the combustion chamber side of the upper piston ring is much lower then the pressure on the crankcase side of the upper piston ring. As a result, the noxious emissions of the engine are increased. In a typical prior art engine like the one discussed above, and assuming that no catalyst is used, the engine output of hydrocarbons is between about 12 to 20 grams per horsepower per hour of operation for a single cylinder engine.

Therefore, it is desirable to reduce the level of hydrocarbons that are exhausted out of an internal combustion engine.

SUMMARY OF THE INVENTION

A piston—piston ring assembly for an internal combustion engine is disclosed which lessens the noxious exhaust emissions of the engine.

In a preferred embodiment, the invention includes a piston having an upper groove that includes a first upper surface and a second lower surface, and having a at least one lower groove disposed in a periphery of the piston that has a third upper surface and a fourth lower surface. At least one vent passageway is formed in either the third surface or the fourth surface of the lower groove, and is in fluid flow communication with an aperture in the piston. A first piston ring is disposed in the upper groove and at least one second piston ring is disposed in the lower groove. The height of the second piston ring is sufficiently less than the height of the lower piston ring groove as to permit fluid flow communication between the second piston ring and either the third surface or the fourth surface of the lower groove. In a preferred embodiment, the height of the lower piston ring is between 0.001 to 0.005 inches less than the height of the lower piston ring groove. Also in a preferred embodiment, the vent passageway comprises an elongated slot in either the third or fourth surfaces, and the aperture is disposed in a back surface of the lower piston ring groove.

The present invention also includes a unique method for reducing the noxious emissions of an internal combustion engine. The steps in the method include sealing the upper piston ring against the first surface of the upper ring groove when the pressure on the crankcase side of the upper ring is greater than the pressure on the combustion chamber side of the upper ring, sealing the upper piston ring against the second surface of the upper ring groove when the pressure on the combustion chamber side of the upper ring is greater than the pressure on the crankcase side of the upper ring, and providing fluid flow communication between the crankcase side of the upper ring groove and the crankcase, and around or through the lower ring, when the upper piston ring is sealed against either of the first surface or the second surface of the upper ring groove. In a preferred embodiment, the method also includes the steps of tapering the first surface and tapering the second surface such that the tapered surfaces are parallel to each other. Only a radially outward or inward portion of the first surface contacts the upper piston ring when the upper piston ring is sealed against the first surface. Similarly, when a tapered lower surface is used, the upper piston ring contacts only a radially outward or inward portion of the second surface when the upper piston ring is sealed against the second surface.

Fluid flow communication is provided between the crankcase side of the upper piston ring groove and the crankcase, and around the lower piston ring, by providing a vent passageway in the lower piston ring groove, and by providing an aperture in the piston that is in fluid flow communication with the vent passageway. In the alternative, the lower piston ring may be provided with at least one axially-extending aperture that permits fluid flow across the lower piston ring. The fluid flow providing step also preferably includes providing a sufficient clearance between the lower ring and the lower ring groove to permit combustion gases to pass around the lower ring.

In an alternate embodiment, the method may include providing a second lower piston ring groove, providing a second lower piston ring in the second lower piston ring groove, and providing fluid flow communication around or through the second lower piston ring when the upper piston ring is sealed against either the first surface or the second surface of the upper piston ring groove.

As a second alternative, the method may include providing a second lower piston ring, adjacent to the first lower piston ring, in the same lower piston ring groove, and providing fluid flow communication around or through the second lower piston ring when the upper piston ring is sealed against either the first surface or the second surface of the upper piston ring groove.

The apparatus and method according to the present invention reduce noxious emissions by operating the upper piston ring essentially like a check valve, and by permitting combustion gases trapped on the crankcase side of the upper piston ring groove to travel only in a direction toward the crankcase.

When the upper piston ring is sealing against the first surface of the upper piston ring groove, trapped combustion gases are prevented from proceeding from the crankcase side of the upper piston ring to the combustion chamber side of the upper piston ring. Combustion gases trapped on the crankcase side of the upper piston ring are substantially vented toward the crankcase, thereby lessening the amount of combustion gases that are exhausted out of the engine when the exhaust valve is opened. When the upper piston seals against the second surface of the upper piston ring groove, combustion gases from the combustion chamber substantially are prevented from passing to the crankcase side of the upper ring groove, and more importantly, crankcase gases on the crankcase side of the upper piston ring are substantially prevented from passing into the combustion chamber. As a result, combustion gases on the crankcase side of the upper piston ring cannot re-enter the combustion chamber and be exhausted when the exhaust valve opens.

The present invention reduces hydrocarbon emissions of a single cylinder, 3.5 horsepower engine from about 12 to 20 grams of hydrocarbons per horsepower per hour to about 8 to 9 grams of hydrocarbons per horsepower per hour.

It is a feature and advantage of the present invention to reduce the hydrocarbon emissions from an internal combustion engine without significantly increasing the cost of the engine.

It is yet another feature and advantage of the present invention to use standard piston rings while substantially reducing the hydrocarbon emissions from an internal combustion engine.

These and other features of the present invention will be apparent to those skilled in the art from the following detailed description of the preferred embodiments and the drawings, in which:

BRIEF DESCRIPTION OF THE DRAWINGS

FIG. 6 is a cross sectional side view of a second embodiment of the present invention.

FIG. 7 is a cross sectional side view of a third embodiment of the present invention.

FIG. 8 is a cross sectional side view of a fourth embodiment of the present invention in which two lower piston rings are disposed in the same lower piston ring groove.

DETAILED DESCRIPTION OF THE INVENTION

Figure 1:
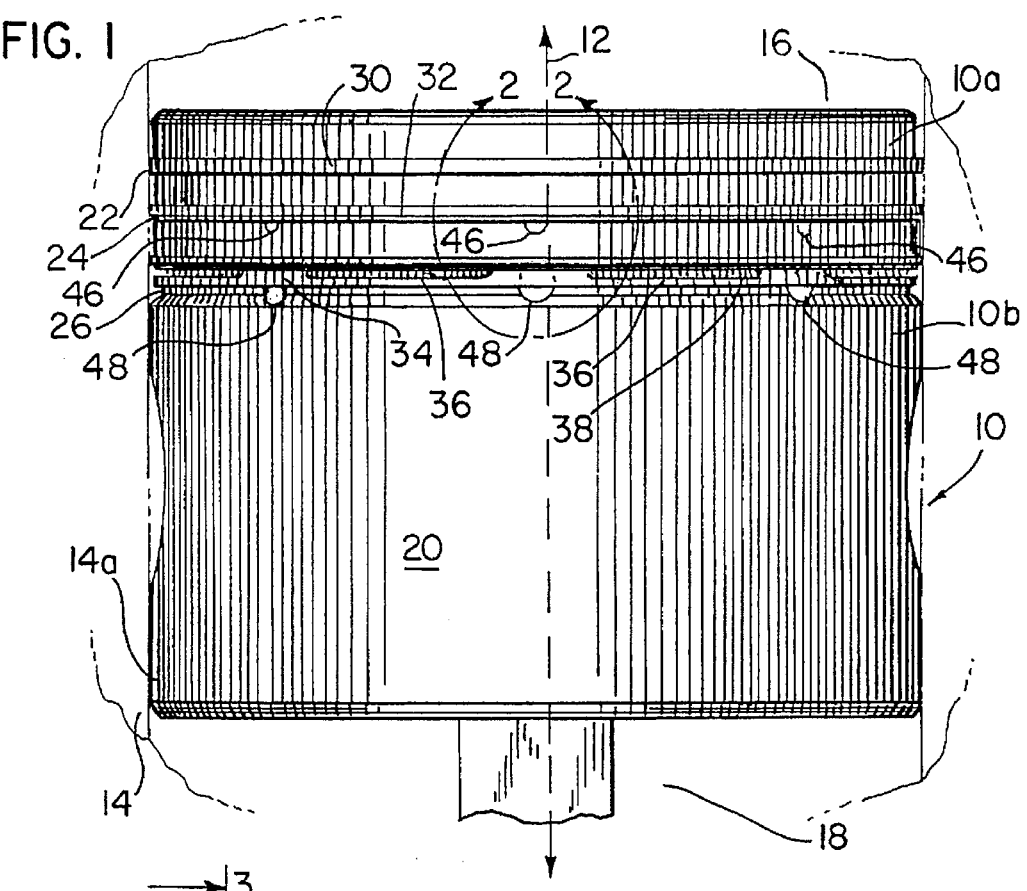
FIG. 1 is a side view of a piston—piston ring assembly according to a first embodiment of the present invention.

FIG. 1 depicts a piston—piston ring assembly according to the present invention. In FIG. 1, a piston 10 is reciprocable along a longitudinal axis 12 in a cylinder 14. The piston 10 is generally disposed between a combustion chamber 16 and a crankcase 18. Combustion of an air/fuel mixture occurs in combustion chamber 16 to produce power and by-product, combustion gases. Some of the combustion gases are exhausted through an open exhaust valve (not shown). When the exhaust valve is open, the pressure on a combustion chamber side 10a of piston 10 is substantially less than the pressure on a crankcase side 10b of piston 10. However, the gas pressure on combustion chamber side 10a is substantially higher than the pressure on crankcase side 10b when the piston is compressing the gases in the combustion chamber.

In a typical prior art piston—piston assembly, some combustion gases from combustion chamber 16 escape from the combustion chamber and are trapped between the outer peripheral surface of the piston and the cylinder wall, between the piston rings, or around the piston ring grooves.

Figure 2:
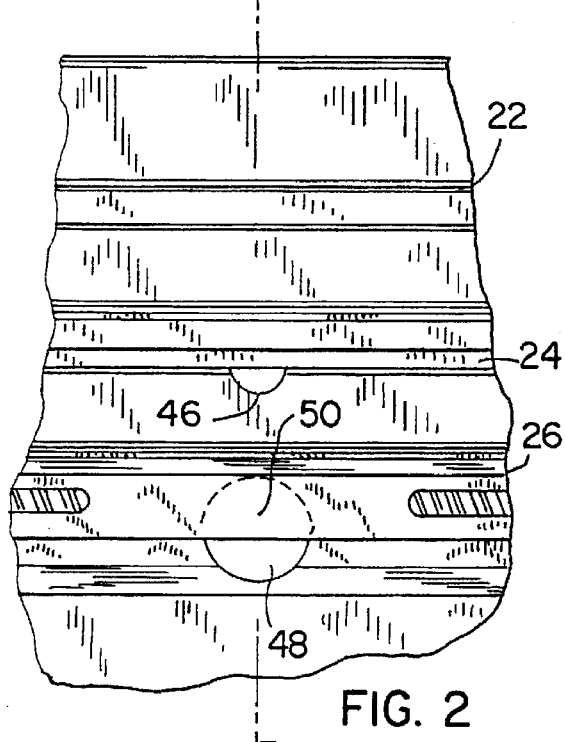
FIG. 2 is a cross sectional side view depicting the piston rings and the piston groove, taken along line 2—2 of FIG. 1.
Figure 3:
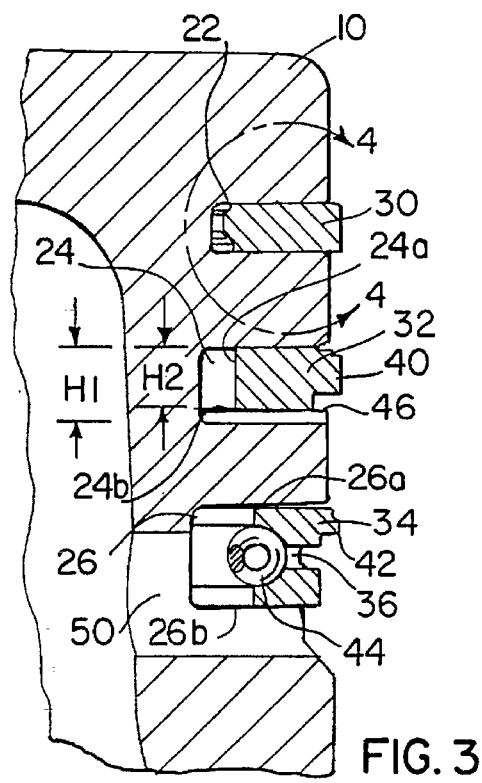
FIG. 3 is a cross sectional side view depicting the first embodiment of the piston—piston ring assembly, taken along line 3—3 of FIG. 2.

As depicted in FIGS. 1 through 3, piston 10 has an outer peripheral surface 20 in which are found an upper piston ring groove 22, a first lower piston ring groove 24, and a second lower piston ring groove 26. In the alternative, the piston may have a single lower piston ring groove 28, as depicted in FIG. 8.

In FIGS. 1 through 3, a first, upper piston ring 30 is provided in upper piston ring groove 22. A first, lower piston ring 32 is provided in lower piston ring groove 24, and a second lower piston ring 34 is provided in lower piston ring groove 26. Each of piston rings 30, 32 and 34 may be a standard, commercially available piston ring. Piston ring 34 may include a plurality of elongated slots 36.

As best shown in FIG. 3, lower ring 32 includes an oil wiper 40, and lower ring 34 includes an oil wiper 42. As shown in FIGS. 1 through 3, a spring 44 may be disposed radially inward from piston ring 34 to apply a force to the piston ring in a radially outward direction.

As best shown in FIGS. 1 and 2, lower piston ring groove 24 includes a plurality of vent passageways 46 which, together with the clearance between piston ring 32 and its associated piston ring groove 24, permit combustion gases to pass around piston ring 32. Similarly, piston ring groove 26 has a plurality of elongated vent passageways 48 which are in fluid flow communication with an aperture 50 in the piston 10. Aperture 50 is shown in phantom in FIGS. 1 and 2, and is best shown in FIG. 3.

In FIG. 3, piston ring groove 24 includes an upper surface 24a and a lower surface 24b. The distance between upper surface 24a and lower surface 24b is designated as a height H1. Lower piston ring 32 disposed in groove 24 has a height H2, as shown in FIG. 3. In a preferred embodiment, height H2 is sufficiently less than height H1 as to permit gases to pass between either surface 24a and ring 32, or between surface 24b and ring 32. In a preferred embodiment, height H2 is about 0.001 to 0.005 inches less than height H1, with 0.003 inches being preferred. To further increase the gas flow around ring 32, an aperture may be provided in piston 10 that is in fluid flow communication with groove 24, similar to aperture 50.

As best shown in FIG. 3, the height of groove 26 is also sufficiently greater than the height of ring 34 in the axial direction as to permit fluid flow between upper groove surface 26a and ring 34 and/or between lower groove surface 26b of groove 26 and ring 34. Again, the clearance is between about 0.001 to 0.005 inches, with 0.003 being preferred.

Combustion gases that may be trapped between piston 10 and the cylinder wall 14a of cylinder 14 are vented in a direction toward crankcase 18 (FIG. 1) by providing the above-referenced clearances between ring 32 and groove 24, and by providing the clearance between ring 34 and groove 26, vent passageway 46, elongated slots 36, passageways 48 (FIG. 1), and aperture 50.

FIGS. 6 through 8 depict alternate embodiments of the piston—piston ring assembly according to the present invention. In FIG. 6, piston 52 includes an upper ring groove 22 having an upper ring 30. Piston 52 also includes a first lower ring groove 54 having a piston ring 56, and a second lower piston ring groove 58 having a second lower piston ring 60. Piston rings 56 and 60 are substantially identical to each other, and are also substantially identical to piston ring 34 in FIGS. 1 through 3. Each of piston rings 54 and 60 has a plurality of elongated slots 62 and 64 respectively. Each of piston rings 54 and 60 also has an adjacent spring 66 and 68 respectively, which is similar to spring 44 in FIG. 3. Rings 56 and 60 have oil wipers 70 and 72 respectively.

There is sufficient clearance between ring 56 and its associated groove 54 to allow for fluid flow around ring 56. Similarly, there is sufficient clearance between ring 60 and its associated groove 58 to allow fluid flow around ring 60.

FIG. 7 depicts a third embodiment of the present invention which also includes three piston rings and three piston ring grooves. In FIG. 7, piston 74 includes an upper piston ring groove 22 and an upper ring 30, as well as lower piston ring grooves 76 and 78. Groove 76 has a piston ring 80 that includes a wiper 82. Disposed radially inward from ring 80 is a spring 84.

In FIG. 7, piston ring groove 78 includes a piston ring 86 having a wiper 88 integral therewith. Ring 86 does not have an associated spring. Both rings 80 and 86 are used to wipe excess oil from cylinder wall 14a of cylinder 14 (FIG. 1). Also, there is a sufficient clearance between each of rings 80 and 86 and their respective grooves 76 and 78 to allow combustion gases to pass around the respective rings. Each of grooves 76 and 78 may be provided with vent passageways similar to passageways 46 and 48 depicted and described in connection with FIGS. 1 and 2.

As an alternative to the vent passageway in a lower piston ring groove, each of the lower piston rings in each of the embodiments herein may be provided with a plurality of axially-extending apertures for allowing combustion gases to pass through the lower rings.

FIG. 8 depicts a fourth embodiment of the present invention that includes two piston ring grooves 22 and 90. Groove 90 has two lower piston rings 92 and 94 disposed in groove 90 which are adjacent to each other. Groove 90 may also include a plurality of elongated vent passageways 96 which are similar to passageways 48 in FIGS. 1 and 2. Piston 98 in FIG. 8 may include an aperture 100 that is in fluid flow communication with groove 90 and vent passageway 96. The total height of rings 92 and 94 is sufficiently less than the height of groove 90 as to permit combustion gases to pass around rings 92 and 94, into vent passageway 96, into aperture 100, and into the crankcase. Ring 92 includes an oil wiper 102; similarly, ring 94 includes an oil wiper 104.

The lower piston rings in each of the embodiments each have an end gap, with the end gaps being spaced 180° from each other. The end gap of each piston ring is preferably small to allow less oil to get past the ring.

In each of the embodiments disclosed herein, the upper and lower surfaces of the piston groove are preferably tapered approximately 2 degrees with respect to a horizontal axis. The purpose of this taper and the unique operation of the upper piston ring will be discussed in connection with FIGS. 4, 5(a) and 5(b).

Figure 4:
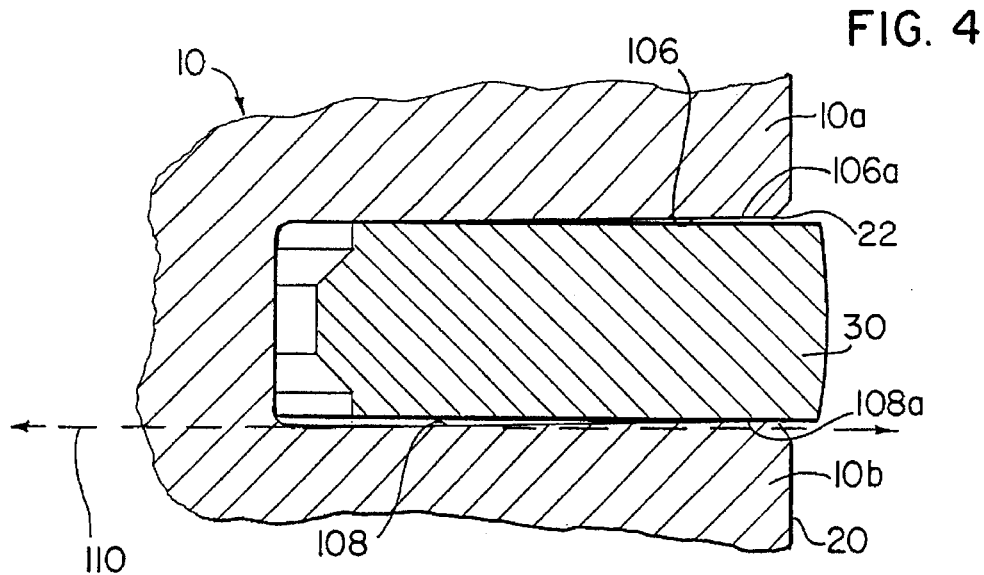
FIG. 4 is a cross sectional side view of an upper piston ring groove and an upper piston ring according to the first embodiment, taken along line 4—4 of FIG. 3.
Figure 5A:
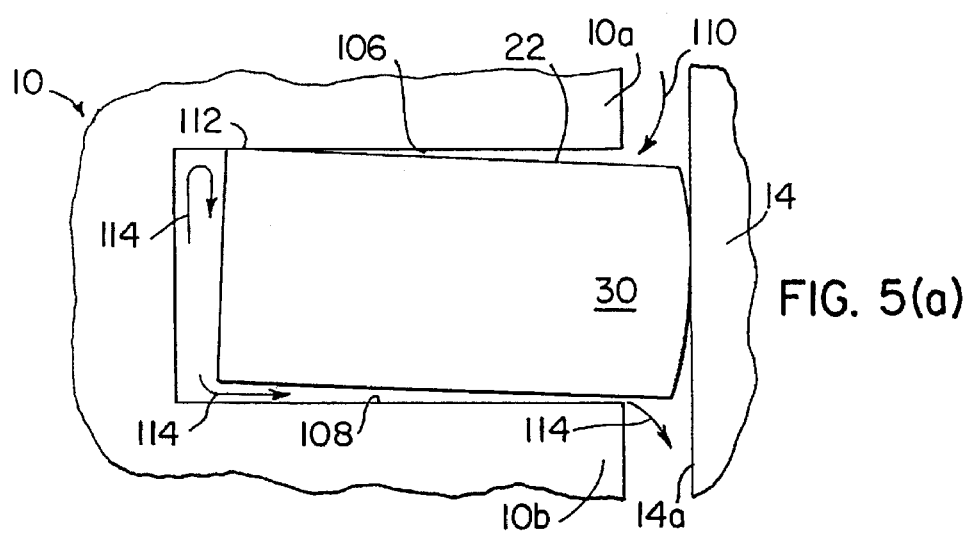
FIG. 5(a) is a side diagrammatic view of an upper piston ring depicting compression sealing at the radially inward portion of the upper piston ring groove.

The manner in which upper piston ring 30 seals against upper piston ring groove 22 will now be discussed in connection with FIGS. 4, 5(a) and 5(b). In FIG. 4, piston ring 30 is disposed in piston ring groove 22. Piston ring groove 22 has an upper surface 106 and a lower surface 108. Both upper surface 106 and lower surface 108 are tapered approximately 2 or more degrees with respect to line 110. Line 110 is normal to piston longitudinal axis 12, depicted in FIG. 1. Tapered upper surface 106 and tapered lower surface 108 are also parallel to each other. The purpose of tapering surfaces 106 and 108 is to promote sealing of upper piston ring 30 against the radially outward portion 106a of surface 106, and also against the radially outward portion 108a of lower surface 108, instead of sealing against a larger portion of either surface 106 or 108 when the pressure differential across piston ring 30 is substantial. The purpose of sealing primarily on the radially outward portions 106a and 108a is to lessen the amount of frictional force imposed upon piston ring 30 when such sealing occurs, thereby allowing the piston ring to respond by moving radially inward or outward as the piston reciprocates in the cylinder. If surfaces 106 and 108 are not tapered, the large frictional force between the piston ring and the piston ring groove may prevent the piston ring from freely moving radially inward and outward as the piston rings contact cylinder wall 14a during piston reciprocation.

In the piston—piston ring assembly according to the present invention, substantially all of the compression sealing occurs across upper piston ring 30, and not across the lower piston rings. In typical prior art assemblies, some compression sealing also occurs across the middle piston ring. In such a prior art arrangement, combustion gases which may be trapped between outer surface 20 of piston 10 and cylinder wall 14a (FIG. 1), or which may be trapped between the upper piston ring and its respective groove, or between the middle piston ring and its respective groove, may move in a direction either toward the combustion chamber or toward the crankcase as the pressures across these respective rings change. As a result, these trapped combustion gases, or other gases from the crankcase, may pass into the combustion chamber and be exhausted when the exhaust valve opens. The noxious engine emissions are increased as a result.

The present invention solves this problem by providing a piston—piston ring assembly in which substantially all of the compression sealing occurs across upper piston ring 30, with the lower piston rings providing oil wiping. Any trapped combustion gases are vented or allowed to pass only in a direction toward the crankcase, and not across the upper piston ring 30 and back into the combustion chamber.

This feature of the present invention is achieved by essentially operating upper piston ring 30 as a check valve, and by providing the vent passageways and apertures discussed above in connection with FIGS. 1 through 3 and 5 through 8, which allow fluid flow communication between crankcase side 10b of piston 10 and the crankcase.

The operation of piston 30 as a check valve will be discussed in connection with FIGS. 5(a) and 5(b). FIG. 5(a) depicts the position of upper piston ring 30 when the pressure on combustion chamber side 10a of upper piston ring groove 22 is substantially less than the pressure on crankcase side 10b of groove 22. In this case, combustion gases from the last combustion event, represented by arrow 110, are prevented from passing across piston ring 30 onto crankcase side 10b since piston 30 is sealing against groove upper surface 106 at point 112. Also, combustion gases which have already crossed piston ring 30, represented by arrows 114, are prevented from moving past point 112 and are thus prevented from reaching combustion chamber side 10a of piston 10. Combustion gases 114 are only allowed to move in the downward direction toward crankcase 18 (FIG. 1), thereby preventing gases 114 from being exhausted out of the open exhaust valve. Thus, piston ring 30 and piston ring groove 22 together operate as a check valve by substantially preventing a significant amount of combustion gases from passing from crankcase side 10b of piston 10 to combustion side 10a of piston 10.

Figure 5B:
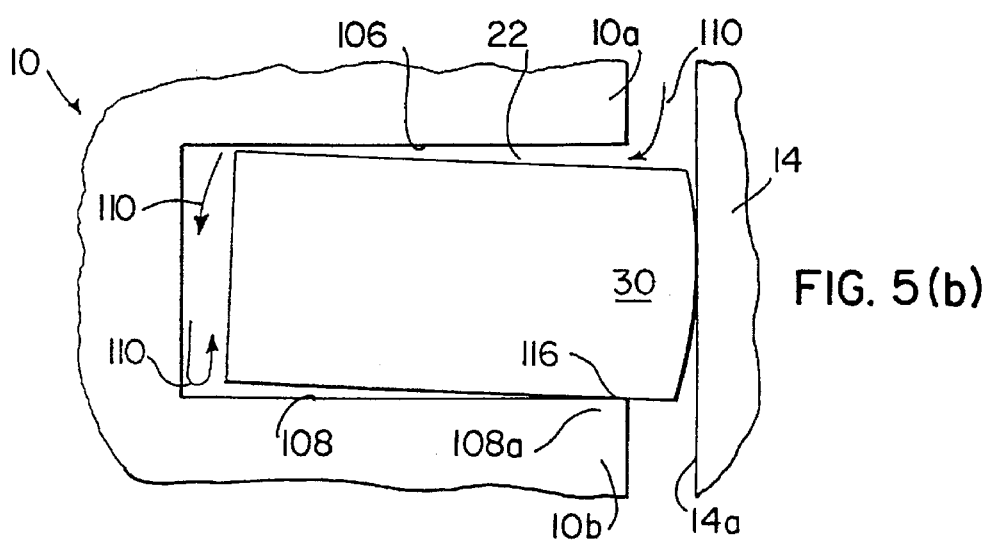
FIG. 5(b) is a side diagrammatic view of an upper piston ring depicting sealing at the radially outward portion of the upper piston ring groove.

FIG. 5(b) depicts the position of piston 30 when the gas pressure on combustion chamber 10a of piston 10 is substantially greater than the pressure on piston side 10b of piston 10. This situation occurs immediately after the combustion event, when the pressure from the combustion event forces piston ring 30 to seal on radially outer portion 108a of surface 108 at point 116. Combustion gases 110 from the combustion chamber are prevented from passing to the crankcase side 10b of piston 10 since they cannot pass point 116. Again, piston ring 30 and piston ring groove 22 together operate as a check valve by substantially preventing a significant amount of combustion gases from crossing to the crankcase side of piston ring 30. At the same time, any combustion gases which may have passed across piston ring 30 are vented toward the crankcase, as discussed above in connection with FIGS. 1 through 3 and 6 through 8.

In the embodiments of FIGS. 1 through 3 and 6 through 7, the middle piston ring seals against the upper surface of its groove on the suction stroke of the engine (when the air/fuel mixture is being introduced into the combustion chamber) but the middle ring does not seal against any surface of the middle ring groove during the power stroke of the engine, thereby allowing gases to move toward the crankcase through the vent passageways discussed above.

While several embodiments of the present invention have been shown and described, alternate embodiments will be apparent to those skilled in the art and are within the intended scope of the present invention. Therefore, the invention is to be limited only by the following claims.

I claim:

1. A piston—piston ring assembly for an internal combustion engine, said engine having a combustion chamber in which combustion gases are produced after a combustion event, said engine also having a crankcase, said assembly comprising:

an upper piston ring;
   at least one lower piston ring having a height;
   a piston having a longitudinal axis and having an outer surface, said piston disposed between said combustion chamber and said crankcase, said piston including
      an upper groove, disposed in the outer surface of said piston, that receives said upper piston ring, said upper groove having a first surface and a second surface that is substantially parallel to said first surface such that said upper piston ring seals against a radially inward portion of said first surface when the pressure on the crankcase side of said upper piston ring is greater than the pressure on the combustion chamber side of said upper piston ring, and such that said upper piston ring seals only against a radially outward portion of said second surface when the pressure on the crankcase side of said upper piston ring is less than the pressure on the combustion chamber side of said upper piston ring;
      at least one lower groove disposed in the outer surface of said piston that receives said at least one lower piston ring, said lower groove having
         a third surface;
         a fourth surface;
         a height H1 defined as the distance between said third and fourth surfaces of said lower groove, wherein said height of said lower piston ring is sufficiently less than said height H1 as to permit said combustion gases to flow between said second piston ring and either said third surface or said fourth surface of said lower groove; and
      means for venting said combustion gases from said lower groove to said crankcase.

2. The piston—piston ring assembly of claim 1, wherein said first surface and said second surface of said upper ring groove are tapered, and wherein each of said tapered surfaces forms an angle of at least 2 degrees with a line normal to said longitudinal axis.

3. The piston—piston ring assembly of claim 1, wherein said height of said lower piston ring is between 0.001 to 0.005 inches less than said height H1 of said lower piston groove.

4. The piston—piston ring assembly of claim 1, wherein said lower piston ring includes an oil wiper.

5. The piston—piston ring assembly of claim 1, wherein said lower piston ring includes at least one circumferential slot.

6. The piston—piston ring assembly of claim 1, further comprising:
   a spring disposed in said lower groove radially inward from said lower piston ring.

7. The piston—piston ring assembly of claim 1, wherein said venting means includes:
   at least one vent passageway in either said third surface or said fourth surface of said lower groove; and
   an aperture in said piston that is in fluid flow communication with said vent passageway.

8. The piston—piston ring assembly of claim 7, wherein said vent passageway comprises an elongated slot.

9. The piston—piston ring assembly of claim 7, wherein said lower groove also has a back surface, and wherein said aperture is disposed in said back surface.

10. The piston—piston ring assembly of claim 1, wherein said venting means includes a plurality of apertures in said lower piston ring.

11. A method of reducing the noxious emissions exhausted from an internal combustion engine, said engine including a crankcase and a combustion chamber in which combustion gases are produced as a result of a combustion event, said engine also including a reciprocable piston disposed between said combustion chamber and said crankcase, said piston having an outer surface, an upper ring groove in said outer surface, said upper ring groove having first and second surfaces each of said surfaces having respective radially inward and radially outward portions and having an upper piston ring disposed in said upper ring groove, said piston also having at least one lower ring groove in said outer surface in which is disposed at least one lower piston ring, said method comprising:

sealing said upper piston ring against said radially inward portion of said first surface of said upper ring groove when the pressure on the crankcase side of said upper ring is greater than the pressure on the combustion chamber side of said upper ring groove;
   sealing said upper piston ring against only said radially outward portion of said second surface of said upper ring groove when the pressure on the combustion chamber side of said upper ring is greater than the pressure on the crankcase side of said upper ring groove; and providing fluid flow communication between said crankcase side of said upper ring groove and said crankcase when said upper piston ring is sealed against said second surface of said upper ring groove.

12. The method of claim 11, further comprising:
providing fluid flow communication between said crankcase side of said upper ring groove and said crankcase, and around said lower ring, when said upper piston ring is sealed against said first surface of said upper ring groove.

13. The method of claim 11, further comprising:
tapering said first surface of said upper piston groove; and
tapering said second surface of said upper piston groove such that said tapered second surface is substantially parallel to said tapered first surface.

14. The method of claim 13, further comprising:
contacting a radially outward portion of said first surface with said upper piston ring when said upper piston ring is sealing against said first surface; and
contacting a radially outward portion of said second surface with said upper piston ring when said upper piston ring is sealing against said second surface.

15. The method of claim 11, wherein said providing step includes:
providing a vent passageway in said lower piston ring groove; and
providing an aperture in said piston that is in fluid flow communication with said vent passageway.

16. The method of claim 11, wherein said providing step includes:
providing a sufficient clearance between said lower ring and said lower ring groove as to permit combustion gases to pass around said lower ring.

17. The method of claim 11, wherein said providing step includes:
providing a plurality of apertures in said lower piston ring.

18. The method of claim 11, further comprising:
providing a second lower piston ring groove;
providing a second lower piston ring in said second lower piston ring groove; and
providing fluid flow communication around said second lower piston ring when said upper piston ring is sealed against said second surface of said upper piston ring groove.

19. The method of claim 18, further comprising:
providing fluid flow communication around said second lower piston ring when said upper piston ring is sealed against said first surface of said upper piston ring groove.

20. The method of claim 11, further comprising:
providing a second lower piston ring in said lower piston ring groove; and
providing fluid flow communication around said second lower piston ring when said upper piston ring is sealed against said second surface of said upper piston ring groove.

21. A piston—piston ring assembly for an internal combustion engine, said engine having a combustion chamber in which combustion gases are produced after a combustion event, said engine also having a crankcase, said assembly comprising:
a piston having a longitudinal axis and having a peripheral surface, including
an upper groove disposed in the peripheral surface of said piston, said upper groove having a first surface and a second surface;
a lower groove disposed in the peripheral surface of said piston, said lower groove having
a third surface;
a fourth surface;
a height H1 defined as the distance between said third and fourth surfaces of said lower groove;
an upper piston ring disposed in said upper groove;
first and second lower portion rings disposed adjacent to each other in said lower groove, wherein said first lower piston ring has a height H2 that is sufficiently less than said height H1 as to permit fluid flow between said first lower ring and either said third surface or said fourth surface of said lower groove, and wherein said first and second lower piston rings have a total height H3 that is sufficiently less than said height H1 as to permit fluid flow between said first and second lower rings on the one hand and either said third or fourth surfaces of said lower groove on the other hand; and
means for venting said combustion gases from said lower groove to said crankcase.

22. The piston—piston ring assembly of claim 21, wherein said height H3 is between 0.001 to 0.005 inches less than said height H1.

23. The piston—piston ring assembly of claim 21, wherein each of said first and second lower rings has an end gap, and wherein said end gaps are disposed about 180 degrees from each other.

24. A piston—piston ring assembly for an internal combustion engine, said engine having a combustion chamber in which combustion gases are produced after a combustion event, said engine also having a crankcase, said assembly comprising:
a piston having a longitudinal axis and having a peripheral surface, including
an upper groove disposed in the peripheral surface of said piston, said upper groove having a first surface and a second surface that are tapered and are parallel to each other;
at least one lower groove disposed in the peripheral surface of said piston, said lower groove having
a third surface;
a fourth surface;
a height H1 defined as the distance between said third and fourth surfaces of said lower groove;
an upper piston ring disposed in said upper groove;
at least one lower piston ring disposed in said lower groove, said lower piston ring having a height H2, wherein said height H2 is sufficiently less than said height H1 as to permit fluid flow between said lower piston ring and either said third surface or said fourth surface of said lower groove; and
means for venting said combustion gases from said lower groove to said crankcase.

25. The piston—piston ring assembly of claim 24, wherein each of said tapered surfaces forms an angle of at least 2 degrees with a horizontal line normal to said longitudinal axis.

26. A piston—piston ring assembly for an internal combustion engine, said engine having a combustion chamber in which combustion gases are produced after a combustion event, said engine also having a crankcase, said assembly comprising:
an upper piston ring;
first and second lower piston rings having a total height;
a piston having a longitudinal axis and having an outer surface, said piston disposed between said combustion chamber and said crankcase, said piston including an upper groove, disposed in the outer surface of said piston, that receives said upper piston ring, said upper groove having a first surface and a second surface that is substantially parallel to said first surface such that said upper piston ring seals against said first surface when the pressure on the crankcase side of said upper piston ring is greater than the pressure on the combustion chamber side of said upper piston ring, and such that said upper piston ring seals against said second surface when the pressure on the crankcase side of said upper piston ring is less than the pressure on the combustion chamber side of said upper piston ring;

a lower groove disposed in the outer surface of said piston that receives said first and second lower rings disposed adjacent to each other, said lower groove having a third surface;

a fourth surface;

a height H1 defined as the distance between said third and fourth surfaces of said lower groove, wherein said total height of said first and second lower rings is sufficiently less than said height H1 as to permit said combustion gases to flow between said first and second lower rings on the one hand and either said third surface or said fourth surface of said lower groove on the other hand; and means for venting said combustion gases from said lower groove to said crankcase.

27. The piston—piston ring assembly of claim 26, wherein the total height of said first and second lower rings is between 0.001 to 0.005 inches less than said height H1.

28. The piston—piston ring assembly of claim 26, wherein each of said first and second lower rings has an end gap, and wherein said end gaps are disposed about 180 degrees from each other.

29. A piston—piston ring assembly for an internal combustion engine, said engine having a combustion chamber in which combustion gases are produced after a combustion event, said engine also having a crankcase, said assembly comprising:

an upper piston ring;

a piston having a longitudinal axis and having an outer surface, said piston disposed between said combustion chamber and said crankcase, said piston including an upper groove, disposed in the outer surface of said piston, that receives said upper piston ring, said upper groove having a first surface and a second surface that is substantially parallel to said first surface such that said upper piston ring seals against said first surface when the pressure on the crankcase side of said upper piston ring is greater than the pressure on the combustion chamber side of said upper piston ring, and such that said upper piston ring seals against said second surface when the pressure on the crankcase side of said upper piston ring is less than the pressure on the combustion chamber side of said upper piston ring;

a first lower groove having a first groove height;

a first lower piston ring, having a first ring height, disposed in said first lower groove;

a second lower groove having a second groove height;

a second lower piston ring, having a second ring height, disposed in said second lower groove;

wherein said first ring height is sufficiently less than said first groove height as to permit fluid flow between said first lower ring and said first lower groove;

wherein said second ring height is sufficiently less than said second groove height as to permit fluid flow between said second lower piston ring and said second lower groove; and means for venting said combustion gases from said second lower groove to said crankcase.

* * * * *